(12) United States Patent
Junginger et al.

(10) Patent No.: US 9,123,025 B2
(45) Date of Patent: Sep. 1, 2015

(54) DETECTION AND PREVENTION OF SPAM IN TAGGING SYSTEMS

(75) Inventors: Michael Junginger, Boeblingen (DE); Andreas Nauerz, Boeblingen (DE); Thomas Steinheber, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 628 days.

(21) Appl. No.: 13/554,251

(22) Filed: Jul. 20, 2012

(65) Prior Publication Data

US 2012/0284265 A1 Nov. 8, 2012

Related U.S. Application Data

(63) Continuation of application No. 13/278,602, filed on Oct. 21, 2011, now Pat. No. 8,843,556.

(30) Foreign Application Priority Data

Oct. 25, 2010 (EP) .................................... 10188752

(51) Int. Cl.
*G06F 15/16* (2006.01)
*G06Q 10/10* (2012.01)
*G06F 17/30* (2006.01)
*G06Q 30/00* (2012.01)

(52) U.S. Cl.
CPC .............. *G06Q 10/10* (2013.01); *G06F 17/30* (2013.01); *G06Q 30/00* (2013.01)

(58) Field of Classification Search
USPC ......................................................... 709/204
See application file for complete search history.

(56) References Cited

U.S. PATENT DOCUMENTS

| 7,685,198 | B2 | 3/2010 | Xu et al. |
| 8,595,631 | B2 | 11/2013 | Cragun et al. |
| 2005/0198289 | A1* | 9/2005 | Prakash .................... 709/225 |
| 2006/0277264 | A1 | 12/2006 | Rainisto |
| 2008/0004049 | A1* | 1/2008 | Yigang et al. ................ 455/466 |
| 2008/0155036 | A1 | 6/2008 | Pirzada et al. |
| 2008/0201734 | A1 | 8/2008 | Lyon et al. |
| 2009/0327430 | A1* | 12/2009 | Colvin et al. ................ 709/206 |
| 2010/0235877 | A1* | 9/2010 | Hu et al. ......................... 726/1 |
| 2012/0102112 | A1 | 4/2012 | Junginger et al. |
| 2012/0204032 | A1* | 8/2012 | Wilkins et al. ............... 713/170 |

OTHER PUBLICATIONS

Koutrika, G. et al., "Combating Spam in Tagging Systems: an Evaluation," ACM Transactions on the Web (TWEB) vol. 2, No. 4, pp. 1-34, Oct. 2008.

(Continued)

*Primary Examiner* — Kevin Bates
*Assistant Examiner* — Sm Rahman
(74) *Attorney, Agent, or Firm* — Cuenot, Forsythe & Kim, LLC (57) ABSTRACT

A method for detection of spam in a tagging system can include assigning negative points to each tag in the tagging system responsive to the tag matching at least one spam filter criteria, assigning trust points to a tagger responsive to the tagger's behavior matching at least one tagger filter criteria, wherein the at least one tagger filter criteria depends upon tags assigned by the tagger that are assigned negative points, and restricting a tagging functionality of the tagging system for a tagger if a first predefined threshold of negative trust points is exceeded.

9 Claims, 4 Drawing Sheets

(56) References Cited

OTHER PUBLICATIONS

U.S. Appl. No. 13/278,602, Non-Final Office Action, Apr. 15, 2013, 18 pg.

U.S. Appl. No. 13/278,602, Final Office Action, Oct. 28, 2013, 14 pg.

U.S. Appl. No. 13/278,602, Notice of Allowance, May 16, 2014, 7 pg.

Koutrika, et al., "Combating Spam in Tagging Systems: An Evaluation," ACM Transactions on the Web (TWEB), vol. 2, No. 4, Oct. 2008.

* cited by examiner

DETECTION AND PREVENTION OF SPAM IN TAGGING SYSTEMS

CROSS-REFERENCE TO RELATED APPLICATIONS

This application is a Continuation of U.S. application Ser. No. 13/278,602, filed on Oct. 21, 2011, which claims benefit of European Patent Application Number 10188752.9, filed on Oct. 25, 2010, entitled "System and Method for Detection and Prevention of Spam in Tagging Systems," the entirety of which is incorporated herein by reference.

BACKGROUND

The invention relates generally to detection and prevention of spam.

The more content in the form of documents of all sorts, videos, music and the like is available on the Internet, the more there is a need to structure the content according to the requirements of individual users or user groups. An emerging technology allowing users to structure or categorize content autonomously is known as tagging. Single users may organize their views into the cloud of resources on the Internet via private tags, whereas communities of users may use community tags. These tags may be visible and usable to all users of a community. A tag may be a visual depiction of a special information resource on the Internet. Typically, more often applied tags may be displayed more prominently, e.g., by increased font size, if compared to less often applied ones. This way the view to the resources may be personalized for an easy navigation through large, complex information spaces. A tag may be a more or less relevant keyword or term associated with or assigned to a piece of information, e.g., text document, a spreadsheet, a picture, a geographic map, a blog entry, a video clip, etc., thus, describing the item and enabling keyword-based classification and search of information. The pool of tags available in a system is usually aggregated in what is referred to as a tag cloud.

As tagging systems are gaining in popularity, they become more susceptible to tag spam, i.e., misleading tags that are generated in order to push some resources to increase their visibility. In other cases tag spam may simply confuse users.

Several approaches have been followed in order to improve spam detection in cloud tags. Document U.S. Pat. No. 7,685, 198B2 discloses a defined set of general criteria to improve the efficiency of a tagging system. The set of criteria has been applied to collaboration tag suggestions to a user. The collaboration tag suggestions are based on a goodness measure for tags derived from collective user authorities to combat spam. The goodness measure is iteratively adjusted by reward-penalty algorithms during tag selection. The collaborative tag suggestions can also incorporate other resources, e.g., content-based auto-generated tags.

Document "Combating Spam in Tagging Systems: An Evaluation", ACM Journal Name, Vol. 1, No. 1 2001, pages 1-35 discloses a series of different measures to detect tagging spam. The behavior of existing approaches and malicious attacks, and the impact of a moderator and a ranking model, has been studied.

Thus, there may be a need for an improved architecture, method and system design to properly, reliably and automatically detect spam in tagging systems and, in particular, avoid future misuse of tagging systems in order to make tagging more reliable and trustworthy for users.

BRIEF SUMMARY

This need may be addressed by a method for detection and prevention of spam in a tagging system as well as by a tagging-spam-detection-prevention-engine. One or more embodiments relate generally to a method for detection and prevention of spam and, in particular, to detection and prevention of spam in a tagging system. One or more embodiments also relate to a tagging-spam-detection-prevention-engine, a computer system, data processing program, and a computer program product. It should be noted that the embodiments disclosed within this application are not directed to spam detection in email systems, but rather on cloud tags, which may be seen as a completely different technical field.

According to one embodiment, a method for detection and prevention of spam in a tagging system may be provided. The method may comprise evaluating each tag in the tagging system using a spam filter with at least one spam filter criteria, and assigning negative points to each tag which may match one of the at least one spam filter criteria. Moreover, the method may comprise evaluating a tagger's behavior using a tagger filter with at least one tagger filter criteria, and assigning trust points to the tagger if a tagger's behavior matches one of the at least one tagger filter criteria. Additionally, the method may also comprise restricting a tagging functionality of the tagging system for a tagger if a first predefined threshold of negative trust points may be exceeded, as well as disabling the tagging functionality of the tagging system for the tagger if a second predefined threshold of negative trust points may be exceeded.

In another embodiment, a tagging-spam-detection-prevention-engine may be provided. The engine may comprise a first evaluating unit, adapted for evaluating each tag in the tagging system, using a spam filter with at least one spam filter criteria, and a first assigning unit, adapted for assigning negative points to each tag which matches one of the at least one spam filter criteria. Furthermore, the engine may comprise a second evaluating unit adapted for evaluating a tagger's behavior using a tagger filter with at least one tagger filter criteria, as well as a second assigning unit adapted for assigning trust points to the tagger if a tagger's behavior may match one of the at least one tagger filter criteria. Moreover, the engine may comprise a restricting unit adapted for restricting a tagging functionality of the tagging system for the tagger if a first predefined threshold of negative trust points of the tagger may be exceeded, and a disabling unit adapted for disabling the tagging functionality of the tagging system for the tagger if a second predefined threshold of negative trust of the tagger points may be exceeded.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

It should be noted that the expression "having a spam criteria" may also mean that several criteria may be relevant. They may be independent of each other. Additionally, the trust points of a tagger may be either positive or negative.

The restriction of the tagging functionality mentioned above may comprise allowing a tagger to only assign a certain number of tags in a given timeframe. This may limit user's ability to assign spam tags. Another restriction may be to only allow tags out of the pool of tags that may have already been used by other taggers, either for the information resource or for other information resources. Again another restriction may be only to allow tags that have a natural relationship to the information resource on the Internet. The natural relationship may be defined by a lexical database for the English language such as WordNet, or by a lexical database for the German language, such as WortSchatz. Other lexical databases for other languages may be used. The restriction may also comprise excluding tag words from a black list. The black list may be user specific.

The disabling of the tagging functionality may comprise preventing the tagger from tagging, such that the tagging function of the tagging system may be disabled for a tagger. He might then only see and use tags of other taggers. An even harder consequence may be to exclude a tagger from using the tagging system, such that his user-id may be disabled or blocked for a certain amount of time. Only an administrator may reactivate the tagging functionality for the tagger that may have been identified as a spammer.

In the context of this application, the following principle terms are used:

A tag—This term may denote a keyword that may describe a resource on the Internet or in a Computing Cloud. It should be understood by a person skilled in the art that a Computing Cloud may only exist within an enterprise. Thus, tagging may also be interesting for enterprise content management systems and not only for resources on the Internet.

Tagging system—A tagging system may denote a system that maintains relationships between specific resources, usually identifiable by its Internet or IP address, and may make the tag available to a user. Normally, related tag networks may be made accessible by a user with the help of special visual representations that may also show relationships between different tags. One resource may have several tags.

Tagger—A tagger may denote a user of a tagging system who may assign tags to information resources available on the network. He may use the tags only for personal requirements. On the other side, tags of taggers may be made available to other users or other taggers of a user community.

Tagger behavior—This term may denote specific tagging behavior of a tagger. This may comprise preferences for individual tags, time of a day for tagging, frequency of tagging, special interest fields of tagging, and so on.

Spam—The term spam in the context of tags may denote misleading tags, tags that may be irrelevant. Spam tags may be generated in order to increase the visibility of some resources or simply to confuse users. They may not be useful to increase the transparency of the resources available and of interest to a user community.

Information resource—This term may denote any form of information such as text documents, e-mails, SMS (short message service), MMS, (multimedia message service), BLOG entries, HTML pages, graphical documents, geographic maps, spreadsheets, sound files, video files or image/picture files.

The above-described method for detection and prevention of spam in a tagging system may provide a couple of advantages. In particular, spam in a tagging system may be avoided increasing the quality and usability of the tagging system. It may also increase the attractiveness of a tagging system if it may become known that the tagging system may be especially trustworthy.

In one embodiment of the method, the spam filter criteria may comprise comparing the tag against a bad or black word list. Such a black word list may be defined by an administrator of the tagging system. It may prevent the usage of infamous or undesired words. There may also be a voting system for the taggers for listing a specific word on the black or bad word list.

In another embodiment of the method, one of the spam filter criteria may comprise comparing the tag against a group of words of a lexical database. Such lexical databases may be used as a service in the Internet returning a result list of related words that may have a linguistic or context relevance for a tag and the related information resource. If the tag given may not be part of the result list, negative points may be given to the tag. The tag may also be compared to other tags a tagger may have been assigned in the past. If the new tag may not be part of the tagger's tag list, the tag may be assigned negative points. The amount of negative points may be higher in the case the tag may not be part of the result list of the service of the lexical database.

In yet another embodiment, one of the spam filter criteria may comprise measuring a frequency of tagging of a tagger, and if the frequency may be beyond a predefined threshold, assigning negative spam points to the tag and assigning negative trust points to the tagger. The assignment of negative spam points may also include the option to not change the spam point amount of the tag, i.e., just assign zero points in addition. The threshold may ensure that a tagger may not use an automatic service for tagging, in particular, not tagging with unrelated tags. It may also prevent the tagging system from tags that may be irrelevant for a certain information resource.

In again another embodiment, the method may comprise calculating a reputation factor for a tagger. Such a reputation factor may also be seen as a trust factor. A tagger with a high number of trust points may be seen as especially trustworthy mainly assigning useful tags to information resources, thus, helping other taggers improving the quality of the content of the tagging system. A trust factor may be increased if a tagger increased his trust points over a predefined amount of time, and/or he never got any negative trust points over another predefined period of time. This may ensure that trustworthy taggers may have an increased influence on the tagging system in comparison to those taggers that may be suspect to spam tagging.

In one embodiment, the method may comprise assigning negative trust points to a tagger whose tag may have been removed by either the tagging system or another tagger of a user community. Other taggers may be allowed to vote against a newly assigned tag. There may a predefined timeframe for negative voting against a new tag. If a predefined number of votes may have been achieved—time frame limited or not—an administrator of the tagging system may delete the relevant tag. In another case, a trusted tagger may be allowed to remove the suspicious tag. In again another case, the tagging system may automatically remove the suspicious tag. A suspicious tag may here denote a tag that may have been identified as a spam tag.

In another embodiment, the method may comprise allowing a trusted tagger to suggest tags being removed. A trusted tagger may be defined as a tagger having a predefined amount of trust points assigned. A trusted tagger may also be allowed to remove tags directly. The characteristic to be eligible for removing of tags may be trust point dependent.

In again another embodiment, the method may also comprise assigning more negative points to a tag created by a first tagger having a first reputation factor than to a tag created by a second tagger having a second reputation factor, wherein the first reputation factor may be lower than the second reputation factor. Such a feature may ensure that a more trusted tagger may have more influence on the tagging system than those taggers with a lower trust factor. The most trustworthy taggers may have the highest influence on the tagging system.

Furthermore, a computer or computer system may comprise a tagging-spam-detection-prevention-engine, as described above, and referring to the method for detection and prevention of spam in a tagging system.

It should be noted that embodiments may take the form of an entire hardware implementation, an entire software embodiment or an embodiment containing both, hardware and software elements. In a preferred embodiment, the invention may be implemented in software which includes, but is not limited to, firmware, resident software and microcode.

In one embodiment, a data processing program for execution in a data processing system is provided comprising software code portions for performing the method, as described above, when the program is run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to methods whereas other embodiments have been described with reference to apparatus. However, a person skilled in the art will gather from the above and the following description that, unless otherwise notified, in addition to any combination of features belonging to one type of subject-matter, also any combination between features relating to different subject-matters, in particular between features of the method, and features of the apparatus, is considered as to be disclosed within this document.

The aspects defined above and further aspects of the present invention are apparent from the examples of embodiments to be described hereinafter and are explained with reference to the examples of embodiments. The embodiments are not limited to the examples provided.

In the following, a detailed description of the drawings will be given. All illustrations in the drawings are schematic. Firstly, a block diagram of the method for detection and prevention of spam in a tagging system will be given. Afterwards, several method components, the inventive engine as well as an embodiment of a computer system comprising the inventive engine will be described.

Figure 1:
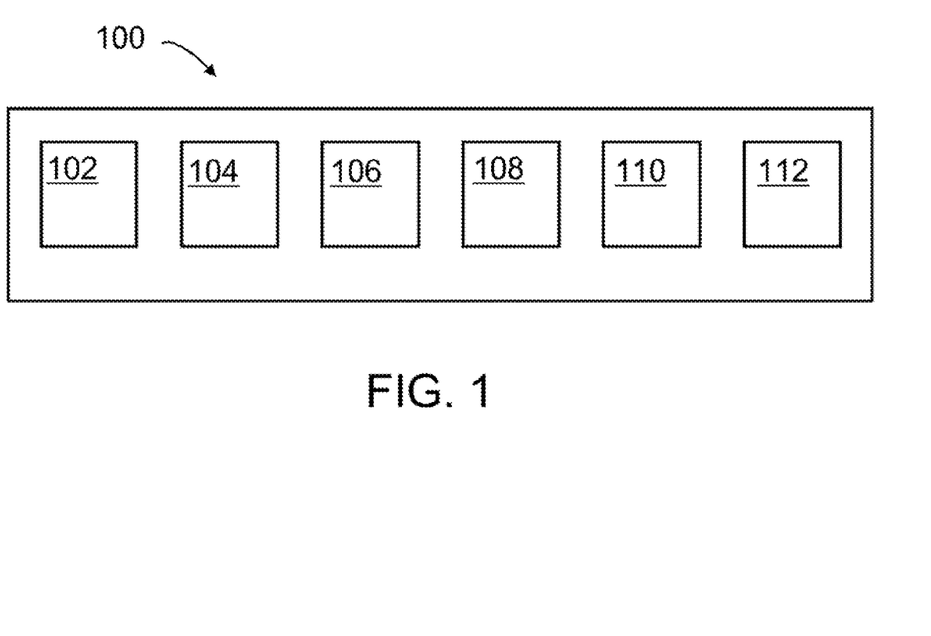
FIG. 1 shows a block diagram of an embodiment of the inventive method.

FIG. 1 shows a block diagram of an embodiment of the method 100 for detection and prevention of spam in a tagging system. The method may comprise evaluating, 102, each tag in the tagging system using a spam filter with at least one spam filter criteria. As another method step, there may be provided assigning, 104, negative points to each tag which may match one of the at least one spam filter criteria, as well as evaluating, 106, a tagger's behavior using a tagger filter with at least one tagger filter criteria. Furthermore, the method may comprise assigning, 108, trust points to the tagger if a tagger's behavior matches one of the at least one tagger filter criteria, and restricting, 110, a tagging functionality of the tagging system for a tagger if a first predefined threshold of negative trust points may be exceeded. Moreover, the method may include the step of disabling, 112, the tagging functionality of the tagging system for the tagger if a second predefined threshold of negative trust points may be exceeded.

Figure 2:
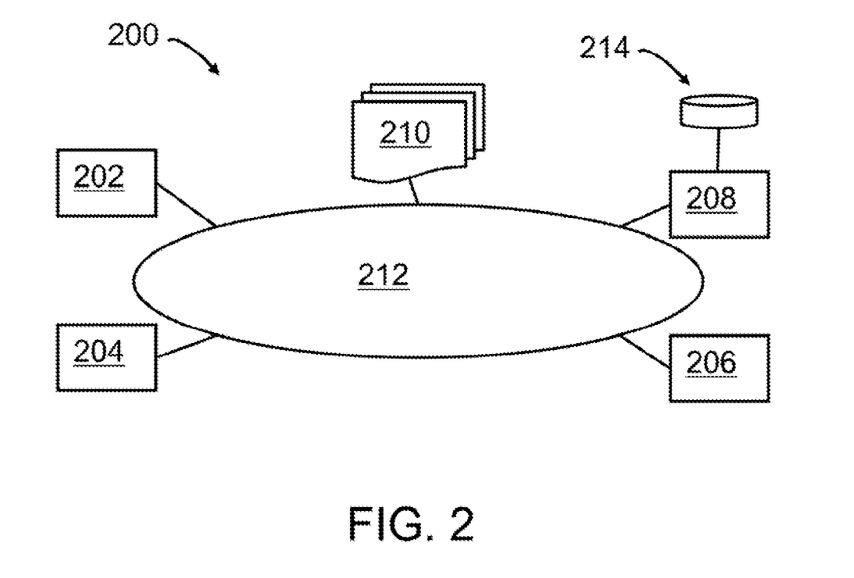
FIG. 2 shows a block diagram of an embodiment of a tagging network.

FIG. 2 shows a block diagram of an embodiment of a tagging network. Several taggers may use computer or other network access systems 202, 204, 206 for accessing a computer network 212, e.g. the Internet. However, it may also be an enterprise internal network as part of an enterprise content management system, e.g., as part of a private cloud. There may be provided diverse information resources 210 in any form of information such as text documents, emails, SMS (short message service), BLOG entries, graphical document, geographic maps, spreadsheets, sound files, video files or image/picture files, or any other form of information resource. A tagging system 208 may link addresses of information resources to tags that may have been assigned to the addresses of the information resources. The tags may be stored as part of the tagging system 208 on a permanent storage 214, e.g., a hard disk.

Figure 3:
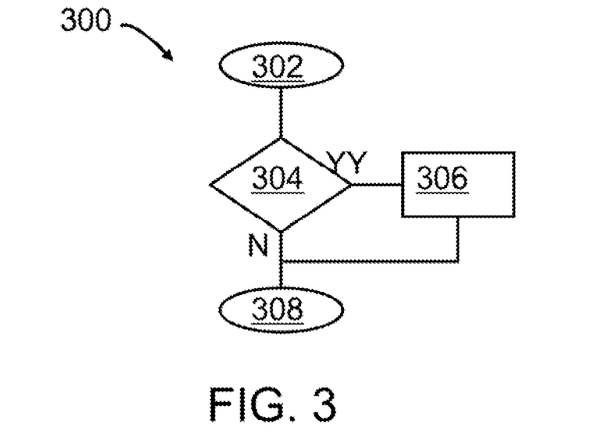
FIG. 3 shows an embodiment of an algorithm for implementing filter criteria.

FIG. 3 shows an embodiment of an algorithm 300 for implementing filter criteria. The general concept regarding different filter criteria may follow similar algorithm characteristics. The criteria test may start at block 302, may test a criterion, 304, and if the criterion may be met, a tag counter may be increased or decreased, 306. If the criterion may not be met, the counter may not be affected.

One criterion may be comparing against a bad or black word list. Such a list may be maintained centrally in the tagging system. If a tagger may try to tag an information resource with a term also found in the bad word list, the tag may receive negative points. The test would be made in block 304 and the assignment of negative points to a tag-counter maintained for every tag may be decreased in block 306. The algorithm component may end at block 308.

Such a model may be based on a tag-counter. If a tag may be newly introduced by a tagger for an information resource, a tag may have 100 tag points initially assuming that none of the filter criteria may be met. If a tag may be found on the bad or black word list by comparing the new tag with a bad or black word list, the tag would be assigned negative tag points reducing the tag counter by the amount of negative points defined for using a word from the bad word list as a tag. Of course, the amount of negative points may be word-individual. If, e.g., 100 negative points may be reached, the tag may be removed automatically, or the tag may be marked to be removed by an administrator of the tagging system.

Another case, in which negative points may be assigned to a tag may be if a word may be used as a tag that may not belong to a normal lexical net of terms belonging to a word. The lexical database used may be service based on an Internet service referring to the WordNet lexical database for the English language or Wortschatz for the Germany language. E.g., 25 negative points may be given to a tag that may have no relevancy in the WordNet of the tag. This way, senseless tags may be reduced or avoided. However, the amount of negative points may be configurable. The configurability of an amount of positive or negative points of any kind, assigned during a certain tag or a tagger, may be guaranteed throughout all parameters of the tagging system.

It may also be tested how often a user may assign tags to one or a group of information resources. It may be an unnatural behavior of a tagger, if he assigns a large number, e.g. hundreds of tags in a short amount of time. It may be assumed that this may not be a typical usage of a tag system. Tagging spam may be assumed. Thus, the frequency of tagging regarding a single tagger may be used for spam detection and prevention. If the frequency may be above a certain predefined threshold, negative points may be assigned to the tag. Assigning negative points to a tag may also comprise assigning zero points to the tag. However, if the frequency may be beyond the just mentioned threshold and if the same tag may repeatedly be used the amount of negative points may also be increased for each time the same tag may be used. At the same time, negative points—so-called trust points—may be assigned to the tagger. Thus, two actions may be executed in block 306: assigning negative points to the tag and assigning negative trust points to the tagger. This way, a misuse of the tagging system may be reduced.

Figure 4:
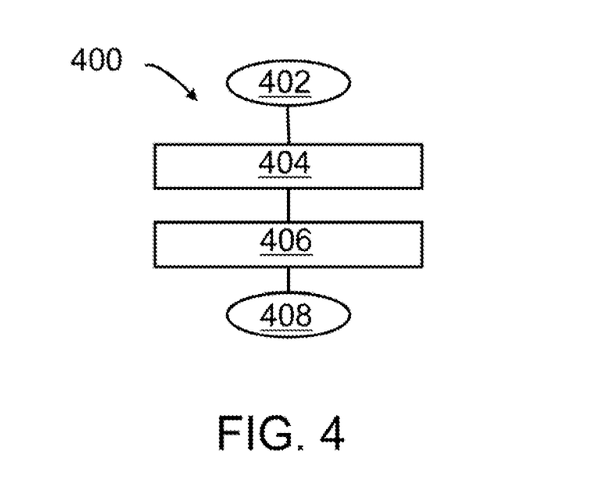
FIG. 4 shows an embodiment of another algorithm of the method.

FIG. 4 may illustrate another algorithm component 400 of the method. Starting at block 402, firstly, a reputation factor may be calculated for a tagger—block 404—and then the reputation factor may be assigned to the tagger in block 406. In block 408 the sequence may end.

Figure 5:
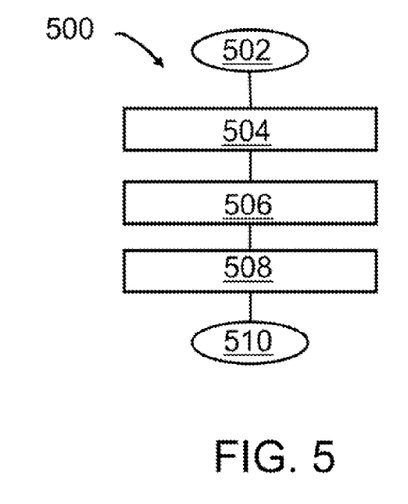
FIG. 5 shows an embodiment of another algorithm of the method.

FIG. 5 may illustrate an alternative algorithm 500. Block 502 may again symbolize the start of the method steps and the end of the partial algorithm may be referenced by reference numeral 510.

A trust factor may be maintained for every tagger of the tagging system. The trust factor may be expressed in a number of trust points a tagger may have collected. Tagger may collect positive or negative trust points, block 504. If, for example, the tagger did only assign tags with positive or neutral tag points over a predefined period of time or a number of tags, the tagger may have assigned additional positive points, block 506. Another parameter may be a time passed-by since the tagger may have been part of the tagging community expressed in an active usage of the tagging system. Thus, the longer a user may not have collected negative points but just positive points, his trust factor may be recalculated and increased, block 508.

However, if a tagger's tag may be removed from the tagging system or by a qualified other tagger, he may receive negative points, e.g., ten negative points for each removed tag.

Thus, the trust factor of a tagger may vary over time depending on a positive user behavior of the tagger. In this sense, acceleration points may be calculated for a tagger if his positive trust point assignments may continue uninterruptedly by negative trust point assignments over a definable time.

Having collected a predefined number of trust points, e.g., 100, a tagger may be eligible for removing a tag with a tag count below a threshold, e.g., 50 tag points immediately. If a tagger may have even more trust points, e.g., 200, a tagger may be enabled to remove any tag in the tagging system immediately.

Furthermore, voting for a tagger for removing certain tags may be activated. Thus, if a certain vote number for removing a tag may be exceeded, any trusted tagger with a predefined number of trust points may remove a suspicious tag. A tagger with a defined number of trust points may also be allowed to propose tags to be removed. The same voting process as already explained, may then be used before removing the tag.

Of course, other calculation models for trust points and voting mechanisms may be used as a skilled person may understand from the context of this application.

Tags of a tagger that may have been banned from using the tagging system may be removed immediately by the system, or may be marked to be removed by an administrator of a tagger with a defined number of trust points. The bad tag may additionally be maintained on a black list.

If a tagger may have collected a certain amount of negative trust points his tagging ability in the tagging system may be reduced in steps. Firstly, there may be warnings in form of messages that may be displayed to the tagger when using the tagging system that his trust point count decreases. If one of his tags may have been assigned negative trust points for the reason given above he also may receive warning.

As a second measure, his tagging functionality may be restricted in that a frequency of assigning new tags may be decreased. The tagger may, e.g. assign only one tag per five minutes or per hour. This tagging frequency may, of course, be configurable. Alternatively, a tagger having access to only restricted tagging functionality may only be allowed to use tags out of a defined allowed word list or out of a group of words available by WordNet for a given word relating to the relevant information resource for the English language. In other languages other lexical databases may be used.

However, it may be the case that older tags of a tagger may be removed from the system by voting or by direct removal of trusted taggers. In this case, the trust points of the tagger may be reduced even more. If a second threshold of trust points may be reached or exceeded, the tagger may be excluded from the tagging community meaning that his account may be shut down and he may no longer use any tagging functions. Only an administrator may reactivate his tagging functionality.

Taggers may also be allowed to assign negative tag points to tags. A defined amount of trust points per tagger may be required for such functionality. And, a tagger having a higher number of trust points, meaning having a high reputation, may assign a higher number of negative tag points to a tag than a tagger having a lower number of trust points, and thus, a lower reputation factor.

Some of these dependencies may also be illustrated by the following example. The points assigned may vary depending on the configuration of the tagging system and may only be understood as non-restrictive examples.

Points assigned may be dependent of the time in a community of taggers: A calculation may be equal to days as member of the community, divided by the existence days of the community times 10. A second variable may be the number of good tags assigned per day.

There may be three taggers: Alice, Bob and Charly. The community of taggers may have been created 100 days ago. Alice may have joined 80 days ago, Bob 60 days ago and Charly 20 days ago. This may lead to:

Alice: 8 positive points,

Bob: 6 positive points,

Charly: 2 positive points.

Alice may have applied 10 tags per day, wherein each tag may have 0 negative points (on average). Bob may have applied 5 tags, and Charly just 2.

This leads to the following reputation points:

Reputation points for Alice=8+50=58,

Reputation points for Bob=6+25=31,

Reputation points for Charly=12.

Now, a spammer may sign up to the system. As he may be a new user, he may not get any positive points. This may lead to: Spammer points=0.

One scenario may be as follows: A Spammer may assign 1000 tags in 5 minutes (means 200 tags per minute) all of them being nonsense. As he may have 0 positive points, each tag may start with 0 points. The $1^{st}$ tag may not be found in WordNet etc., thus it may receive 25 np (negative points). The $2^{nd}$ one cannot be found either; thus, it may receive 25 np+10 np+1 np=37 np (10 np because another bad word from a black list may have been applied within the last 10 minutes too; 1 np because 1 other tag may have been applied within the last 2 minutes). The $3^{rd}$ tag may receive: 25 np +20 np+4 np=49 np. The $4^{th}$ tag may receive: 25 np+30 np+9 np=64 np. The $5^{th}$ tag may receive: 25 np+40 np+16 np=81 np. The $6^{th}$ tag may receive: 25 np+50 np+25 np=100 np.

This means that all tags after the 5th tag may receive more than 100 np and may be removed because the negative point pointer may exceed 100 negative points. This also means that the tagger himself may receive the following negative points: For the $6^{th}$ tag being removed: 10 np. For the $7^{th}$ tag: 10 np and so on.

When the tagger may have received 100 negative points he may be marked as spammer and all his tags may be removed and all tagging functions may be disabled as described above.

Figure 6:
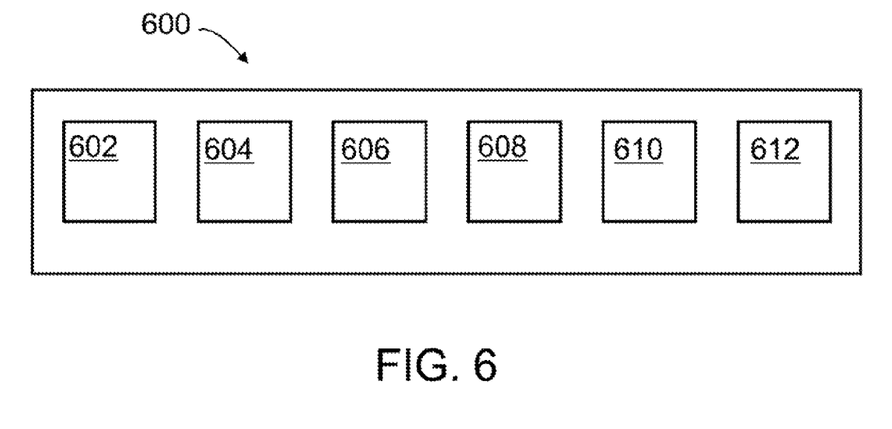
FIG. 6 shows an embodiment of the inventive engine.

FIG. 6 shows an embodiment of the inventive tagging-spam-detection-prevention-engine 600. The engine 600 may have the following components: a first evaluating unit 602 adapted for evaluating each tag in the tagging system using a spam filter with at least one spam filter criteria, and a first assigning unit 604 adapted for assigning negative points to each tag which may match one of the at least one spam filter criteria. The engine may also comprise a second evaluating unit 606 adapted for evaluating a tagger's behavior using a tagger filter with at least one tagger filter criteria, as well as a second assigning unit 608 adapted for assigning trust points to the tagger if a tagger's behavior matches one of the at least one tagger filter criteria. Furthermore, the engine may comprise a restricting unit 610, adapted for restricting a tagging functionality of the tagging system for the tagger if a first predefined threshold of negative trust points of the tagger may be exceeded, and a disabling unit 612, adapted for disabling the tagging functionality of the tagging system for the tagger if a second predefined threshold of negative trust of the tagger points may be exceeded. The restriction and disabling unit 610 and 612 may work as described above.

Figure 7:
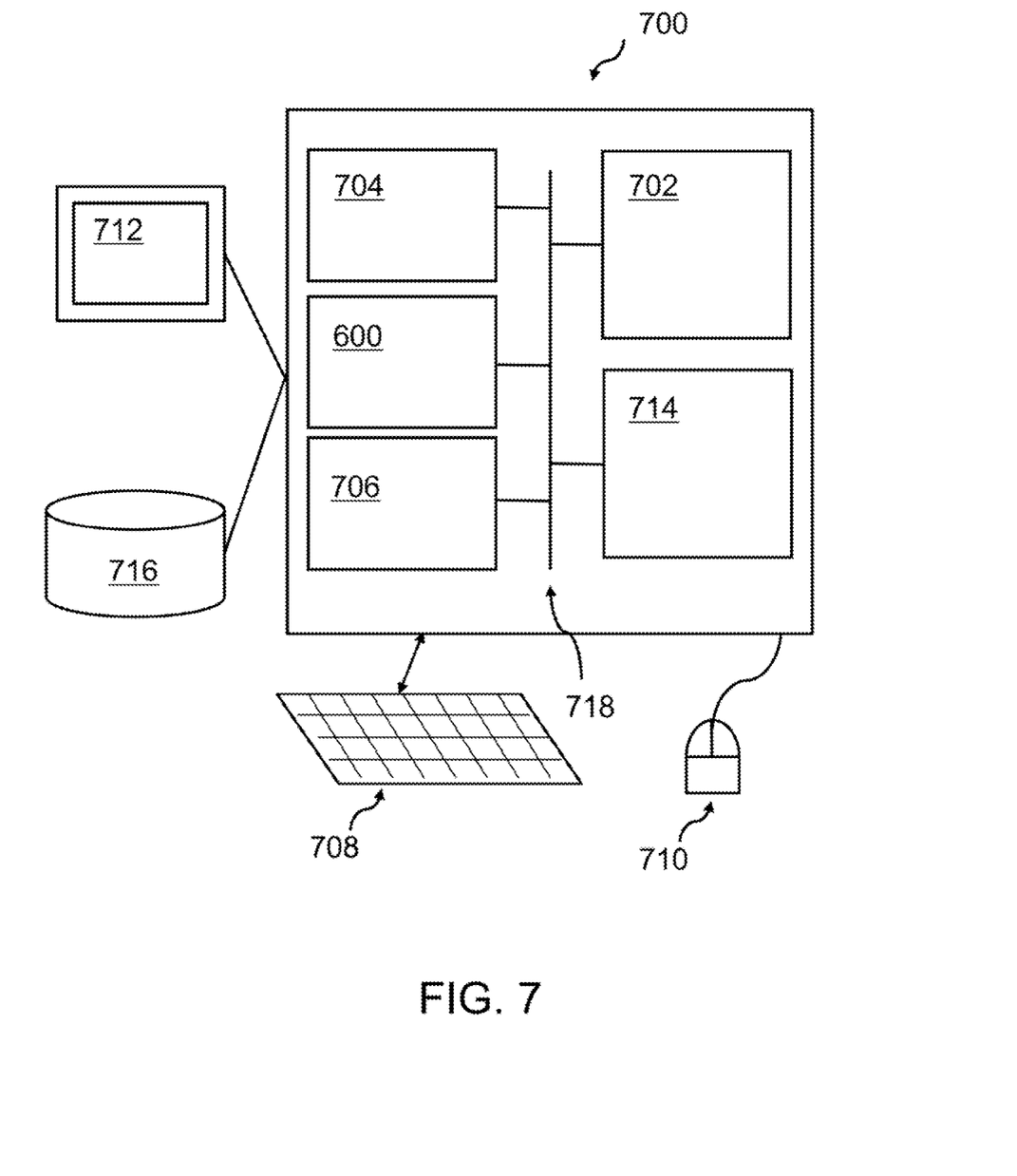
FIG. 7 shows an embodiment of a computer system comprising the inventive engine.

Embodiments of the invention may be implemented on virtually any type of computer, regardless of the platform being used suitable for storing and/or executing program code. For example, as shown in FIG. 7, a computer system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities typical of today's computers (not shown). The memory elements 704 may include a main memory, employed during actual execution of the program code, and a cache memory, which provides temporary storage of at least some program code or data in order to reduce the number of times, code must be retrieved from external bulk storage 716 for an execution. Elements inside the computer 700 may be linked together by means of a bus system 718 with corresponding adapters. Additionally, a tagging-spam-detection-prevention-engine engine 600 may be attached to the bus system 718.

The computer system 700 may also include input means, such as a keyboard 708, a mouse 710, or a microphone (not shown). Furthermore, the computer 700, may include output means, such as a monitor 712 [e.g., a liquid crystal display (LCD), a plasma display, a light emitting diode display (LED), or cathode ray tube (CRT) monitor]. The computer system 700 may be connected to a network (e.g., a local area network (LAN), a wide area network (WAN), such as the Internet, or any other similar type of network, including wireless networks via a network interface connection 714. This may allow a coupling to other computer systems. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

Further, those skilled in the art will appreciate that one or more elements of the aforementioned computer system 700 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device or medium.

While a limited number of embodiments of the invention have been described, those skilled in the art, benefitting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

The invention claimed is:

1. A method for detection of spam in a tagging system comprising:

assigning negative points to each tag in the tagging system responsive to the tag matching at least one spam filter criteria;

assigning trust points to a tagger responsive to the tagger's behavior matching at least one tagger filter criteria, wherein the at least one tagger filter criteria depends upon tags assigned by the tagger that are assigned negative points; and restricting a tagging functionality of the tagging system for a tagger if a first predefined threshold of negative trust points is exceeded using a processor.

2. A method for detection and prevention of spam in a tagging system comprising:
- evaluating each tag in the tagging system using a spam filter with at least one spam filter criteria;
- assigning negative points to each tag which matches one of the at least one spam filter criteria;
- evaluating a tagger's behavior using a tagger filter with at least one tagger filter criteria;
- assigning trust points to the tagger if a tagger's behavior matches one of the at least one tagger filter criteria;
- restricting a tagging functionality of the tagging system for a tagger if a first predefined threshold of negative trust points is exceeded using a processor; and
- disabling the tagging functionality of the tagging system for the tagger if a second predefined threshold of negative trust points is exceeded.

3. The method according to claim 2, wherein one of the spam filter criteria comprises comparing the tag against a bad word list.

4. The method according to claim 2, wherein one of the spam filter criteria comprises comparing the tag against a lexical database.

5. The method according to claim 2, wherein one of the spam filter criteria comprises measuring a frequency of tagging of a tagger, and if the frequency is beyond a predefined threshold, assigning negative spam points to the tag and assigning negative trust points to the tagger.

6. The method according to claim 2, further comprising calculating a reputation factor for a tagger.

7. The method according to claim 2, further comprising assigning negative trust points to tagger whose tag has been removed by either the tagging system or another tagger of a user community.

8. The method according to claim 2, further comprising allowing a trusted tagger to suggest tags being removed.

9. The method according to claim 2, further comprising assigning more negative points to a tag created by a first tagger having a first reputation factor than to a tag, created by a second tagger having a second reputation factor, wherein the first reputation factor is lower than the second reputation factor.

* * * * *

UNITED STATES PATENT AND TRADEMARK OFFICE
CERTIFICATE OF CORRECTION

Page 1 of 1

PATENT NO.         : 9,123,025 B2
APPLICATION NO.    : 13/554251
DATED              : September 1, 2015
INVENTOR(S)        : Michael Junginger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 628 days.

The following statement should be included immediately afterward:

--This patent is subject to a terminal disclaimer.--

Signed and Sealed this
Fifth Day of April, 2016

Michelle K. Lee
*Director of the United States Patent and Trademark Office*